Dec. 5, 1967     F. R. BELL ET AL     3,356,580
METHOD AND APPARATUS FOR CONTAINING RADIOACTIVE FLUID
Filed Sept. 7, 1966
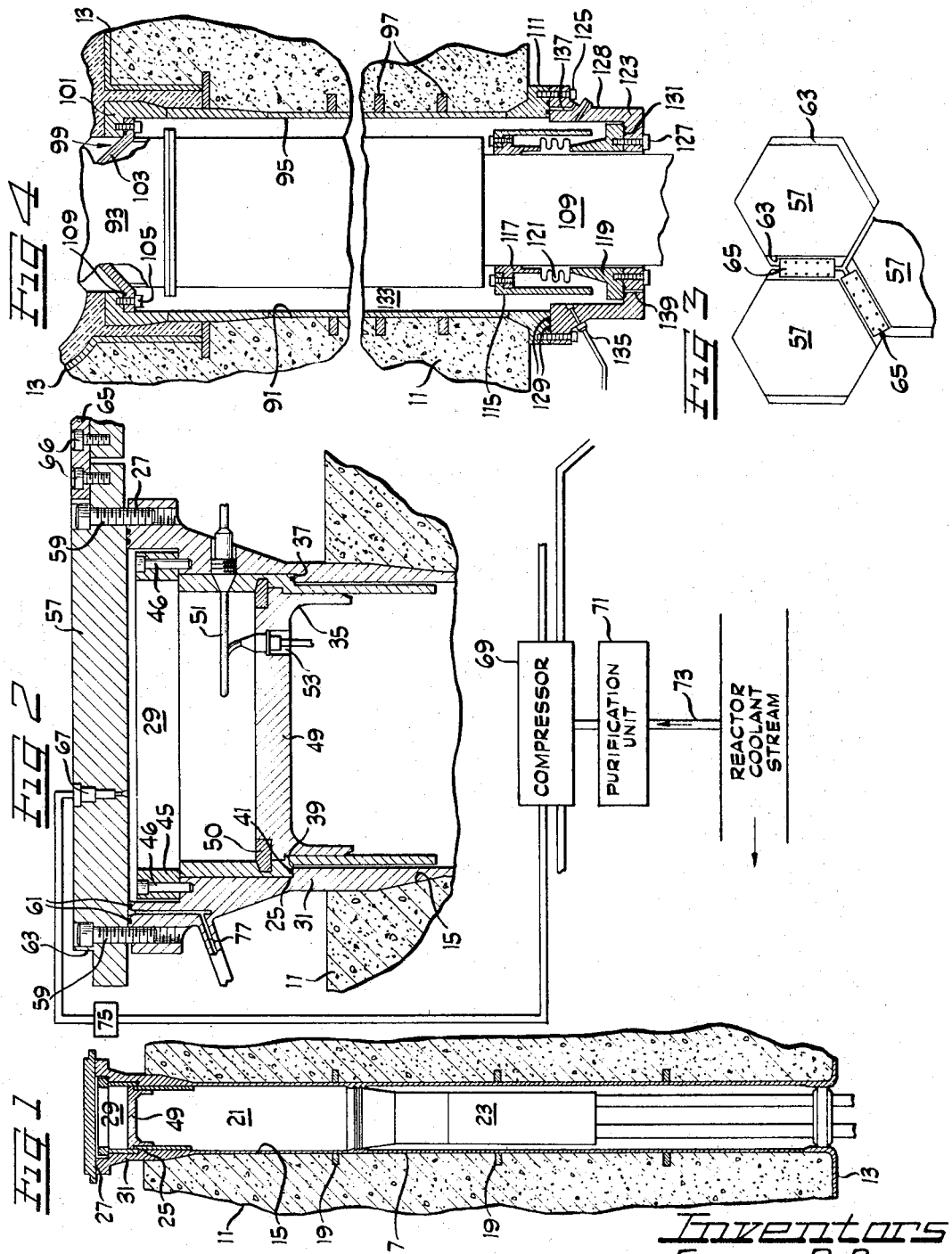
Inventors
FRANCIS R. BELL
IAN P. ARTHUR 3,356,580
METHOD AND APPARATUS FOR CONTAINING RADIOACTIVE FLUID
Francis R. Bell and Ian P. Arthur, San Diego, Calif., assignors to the United States of America, as represented by the United States Atomic Energy Commission
Filed Sept. 7, 1966, Ser. No. 577,777
3 Claims. (Cl. 176—37)

ABSTRACT OF THE DISCLOSURE

A method and apparatus for containing a high pressure coolant stream of an operating nuclear reactor. Each penetration opening of the reactor pressure vessel is sealed with inner and outer sealing means and higher pressure is continuously maintained in the region betwen said inner and outer sealing means.

---

This invention relates to the containment of radioactive fluids and more particularly to a method and apparatus for containing a high pressure coolant stream of an operating nuclear reactor.

Many nuclear reactors include a metal pressure vessel and a surrounding secondary containment vesel. In such reactors, the two separate surrounding vessels were utilized for protection against the escape of radioactivity. Progress in technology has now shown that it is feasible to construct a single vessel of prestressed reinforced concrete which has redundancy of structural members such that it will provide protection against the escape of radioactivity equivalent to that provided by a metal pressure vessel and surrounding secondary containment vessel. In such a vessel there is only a single major barrier against the escape of radioactive fluids, and accordingly the problem of containing a radioactive coolant therewithin becomes more critical. Improved methods and apparatus for containing radioactive fluids under pressure are desired.

It is a principal object of the present invention to provide an improved method and apparatus for containing radioactive fluids under pressure. It is another object of the invention to provide improved apparatus for containing a radioactive gas in a desired zone or container. A further object of the invention is to provide apparatus for positively sealing a penetration opening in a nuclear reactor pressure vessel in a manner which insures against escape of a fluid coolant toutward through this penetration opening. Still another object of the invention is to provide a method for containing a radioactive gaseous coolant under high pressure within a prestressed concrete pressure vessel in a manner which positively insures against the leakage of this gas through a penetration opening in the concrete pressure vessel. These and other objects of the invention are more particularly set forth in the following detailed description and in the accompanying drawings wherein:

FIGURE 1 is a vertical sectional view through a portion of a nuclear reactor pressure vessel illustrating various of the features of the invention;

FIGURE 2 is an enlarged fragmentary sectional view showing portions of FIGURE 1 in greater detail;

FIGURE 3 is a fragmentary plan view of the portion of the pressure vessel shown in FIGURES 1 and 2; and FIGURE 4 is a schematic sectional view of another portion of the pressure vessel illustrating an alternative embodiment of the invention.

Briefly, the invention provides a method for containing a high pressure, high temperature gas coolant of an operating nuclear reactor by sealing each penetration opening of the reactor pressure vessel with the inner and outer sealing means and continuously maintaining pressure in an intermediate region betwen said inner and outer sealing means which is always higher than the pressure currently being maintained in the operating nuclear reactor. Apparatus is illustrated which employs inner and outer seals at each penetration opening through the wall of the pressure vessel and suitable valve means in connection with the region intermediate said sealing means. The pressure of the coolant stream is increased and supplied through the valve means into each intermediate region at a valve at least about 5 p.s.i. higher than the reactor coolant pressure.

The invention is illustrated with respect to a nuclear reactor pressure vessel 11, which is made of prestressed concrete of a suitable thickness to withstand a pressure substantially above the contemplated operating pressure of the nuclear reactor. The pressure vessel 11 includes an internal lining 13 of a suitable material, such as ¾ inch steel, which serves as a fluid barrier interior of the relatively porous concrete. The primary strength of the pressure vessel is substantially entirely contributed by the prestressed concrete, and the steel liner at operating temperatures and pressures acts generally as a force-transmitting membrane.

In FIGURE 1, a vertically extending penetration opening 15 is shown which serves as a refueling nozzle for the reactor core. The opening 15 is located in what is termed the top head portion of the pressure vessel 11 and provides access to the reactor core which is situated vertically therebelow. It is through refueling nozzles such as this removal and replacement of the fuel elements and portions of the reflector which make up the reactor core are achieved. To maintain a fluid barrier in the penetration openings 15, they are lined with a suitable metal, such as steel. In the illustrated embodiment, a tubular liner 17 is shown which extends the full distance through the concrete pressure vessel 11 and is welded at its inner end to the principal pressure vessel liner 13. The tubular liner 17 has a plurality of rings 19, termed shear rings, welded to the outside thereof which anchor the liner 17 in the concrete which is poured in place around the liner.

In the drawing, the reactor is shown in operating condition with the penetration opening 15 of the pressure vessel 11 sealed. During nuclear reactor operation, a control rod drive assembly 21 is accommodated in the refueling nozzle and surmounts a control rod guide tube assembly 23 which includes a pair of control rods (not shown) that can be driven into the channels provided in the reactor core to the desired depths to control the nuclear reaction.

The penetration opening is closed by both inner sealing means 25 and outer sealing means 27 and therebetween there is provided an intermediate chamber 29 which plays an important part in the present invention. In the illustrated embodiment of the refueling nozzle, the inner and outer sealing means 25 and 27 are both provided near the exterior surface of the concrete pressure vessel 11. A generally tubular housing 31 which is welded to the top of the tubular liner 17, and thus serves as an extension thereof, provides one sealing surface for both the inner and the outer seal.

The inner sealing means 25 includes a primary closure 35 in the form of a hollow cylinder which is closed at its upper end and which is stepped along its exterior surface to provide a horizontal annular downward facing surface 37 which cooperates in the sealing function. Although it could be made as a single piece, the primary closure 35 is usually built up from several pieces to facilitate economical machining thereof. The horizontal annular surface 37 rests upon a cooperating upward facing surface 39 which is formed as a part of the housing 31. An O-ring 41 which is disposed in a suitable groove cut in the annular surface 37 provides the inner seal for the penetration opening 15.

The primary closure 35 is positively held in place by a hold-down ring 45 which is held via bolts 46 to the housing 31 immediately above the top of the primary closure.

A generally circular plate portion 49 of the closure spans the penetration opening and is held in place by a segmented ring 50. Included in the plate portion 49 are fittings through which components necessary for the operation of the apparatus within the refueling nozzle may be passed, one of which is illustrated. An electrical cable 51 is shown which passes through the sidewall of the housing 31 at a location above the top of the prestressed concrete pressure vessel 11, through the sidewall of the primary closure 35 at a location above the circular plate portion 49 and then downward through a suitable aperture in the circular plate portion. An appropriate seal 53 completely closes the aperture through which the electrical cable 51 passes to maintain the integrity of the primary closure.

The outer sealing means 27 includes a generally flat headplate 57 of regular hexagonal shape. The headplate 57 is connected via bolts 59 to the top of the housing 31. The outer seal 27 is established via a pair of concentric O-rings 61 which are disposed in suitable grooves provided in the top surface of the housing 31 and maintain the desired seal when the headplate 57 is tightly bolted to the top of the housing.

Tie bars 65 (see FIGURE 3), residing in side-by-side recesses 63 provided along certain edges of the top surface of the headplates 57 are secured by bolts 66 to adjacent headplates. By this interconnection between adjacent headplates, safety protection is provided in the unlikely event that an accident might cause rupture of the housing 31 or the liner 17 which might have a tendency to blow one of the refueling nozzles outward.

As can be best seen in FIGURE 2, the intermediate chamber 29 is defined by the bottom surface of the headplate 57, the upper surface of the circular plate portion 49, the interior wall of the hold-down ring 45, the interior wall of the upper portion of the primary closure 35 and the interior wall of the housing 31. Access to this chamber 29 is provided via a check valve connection 67 which is situated in the headplate 57 and passes completely through.

Throughout operation of the nuclear reactor, the chamber 29 is supplied with a gas at a pressure slightly above the operating pressure within the primary coolant system of the nuclear reactor, usually a pressure about 5 p.s.i. higher is used. Maintenance of the desired pressure is accomplished in the illustrated reactor (see FIGURE 2) via the employment of a step-up compressor 69 which is connected to a purification unit 71 and to the primary coolant system of the operating nuclear reactor, via a line 73, at a location adjacent the entrance line to the reactor core, where the coolant is at substantially higher pressure than when it leaves the core. The step-up compressor 69 is designed to increase the gas pressure about 5 p.s.i. The purification unit 71 removes any radioactive particles which might be carried by the coolant before it reaches the step-up compressor 69.

By providing an intermediate chamber 29 in association with each penetration opening of the pressure vessel 11 and maintaining each at a pressure higher than the operating pressure of the nuclear reactor, if any leak should develop in the inner sealing means 25, it is assured that the flow of gas will be inward into the reactor core so that leakage and radioactive contamination exterior of the pressure vessel will not result from such a leak. Moreover, in order to detect the occurrence of a leak, each of the lines to the check valve connection 67 is provided with a flow monitoring device 75 which will indicate if there is flow into the intermediate chamber 29 rather than the normally static condition that should be maintained in each chamber. Thus examination of the flow monitors 75 will show immediately where any leak is occurring so that the trouble might be isolated. Instead of individual monitors 75 for each penetration opening, a fitting for connecting such a monitor to each line may be provided and an overall monitor adjacent the compressor 69 provided which will indicate the total coolant leakage from all the chambers 29.

To determine whether a leak which is detected is through the inner sealing means 25 or the outer sealing means 27, a seal monitor passageway 77 is provided in association with each of the outer seals. The seal monitor passageway 77 extends through the housing 31 to the annular region between the two concentric O-rings 61. By monitoring this region for helium, when helium is used as the coolant, it can be quickly determined whether the leakage is through the outer sealing means 27.

An alternate embodiment is shown in FIGURE 4 which is illustrated in connection with a penetration opening 91 in another part of the wall of the pressure vessel 11. The opening 91 is of larger diameter than the refueling opening 15, and a circulator 93 for the gaseous coolant is located therein. The penetration opening 91 is provided with a generally tubular liner 95 which is proportioned to the shape of the opening and which is welded at its inner end via suitable connections to the internal liner 13 of the pressure vessel. The tubular liner 95 is provided with shear rings 97 which anchor the liner in fixed relation within the wall of the pressure vessel.

In this embodiment, inner sealing means 99 is provided adjacent the internal liner 13 of the pressure vessel via a primary closure in the form of a supporting flanged fitting 101 which is welded to the inner end of the tubular liner 95 and which helps support the circulator 93. A ring-shaped mounting bracket 103 for the circulator 93 is connected via bolts 105 to the flanged fitting 101. The actual seal is provided by suitable means, such as a gasket or an O-ring 109 which is seated in a groove provided in the surface of the ring mounting bracket 103.

A ring portion 111 is provided at the exterior end of the tubular liner 95 and may be a separate piece welded thereto. The ring portion 111 serves as an extension of the liner to a point just exterior of the outer surface of the pressure vessel 11. The coolant circulator 93 and its associated concentric piping 109 which extends outward through the pressure vessel bottom head in this penetration opening 91 is supported at the outer end by a suitable bellows-type mounting means 115 which is bolted to the outer ring 111.

Basically, the mounting means 115 comprises a pair of tubular supports 117 and 119 which are disposed adjacent the exterior surface of the concentric tubing which extends inward to the helium circulator 93. The inner support 117 is in contact with the exterior surface of the pipe 109 and provides the area of support. The outer tube support 119 has an inner diameter slightly larger than the outer diameter of the pipe 109 so that it slides freely over the pipe. The inner and outer supports 117, 119 are connected by a bellows 121 to provide the desired support plus accommodation of thermal expansion and contraction in the piping and associated components. The bellows 121 may be appropriately welded to the tubing supports 117 and 119, and the inner tubing support may likewise be welded to the exterior of the outermost pipe 109 to assure leakproof connections.

The outer tubing support member is connected via an adaptor fitting 123 to the outer ring 111. Bolts 125 secure the adaptor 123 to the ring 111, and bolts 127 secure the adaptor to the outer tubular support 119. In this particular construction, both of these bolted connections are sealed and together constitute the outer sealing means 128. The seal between the outer ring 111 and the adaptor 123 is provided via a pair of concentric metal gaskets 129, and the seal between the adaptor 123 and the outer tubular support 119 is provided by another pair of concentric metal gaskets 131.

In this embodiment, an intermediate chamber 133 is provided which extends the length of the penetration opening 91 through the pressure vessel bottom head. A check valve connection 135 is provided in the adaptor fitting 123 through which the gas from the step-up compressor 69 is fed into the chamber 133. Again, passageways 137 and 139 are provided leading to the annular spaces between the pairs of gaskets 129, 131, to facilitate the detection of leakage through the outer seals. A flow monitor may be connected to the check valve connection 135 as previously described with the embodiment shown in FIGURES 1 and 2, and if leakage were to be shown, the outer seal 128 could be checked via the passageways 137 and 139. This arrangement functions similarly to that previously described with regard to the refueling nozzle with the main point of difference being that the inner sealing means 99 for the penetration opening 91 is disposed adjacent the internal surface of the pressure vessel 11.

The use of the single step-up compressor 69 connected to the coolant stream adjacent the inlet into the pressure vessel provides automatic regulation of the pressure within each of the intermediate chambers in correspondence with any change in pressure within the pressure vessel. Moreover, it provides a simple and economically practical solution that assures that the pressure in each region between the inner and outer seals will always exceed the pressure within the nuclear reactor pressure vessel so that any leakage through the inner seal will be inward, thus positively safeguarding against the possibility of radioactive contamination due to leakage at one of the penetration openings. The arrangement is considered to be excellently suited for employment in nuclear reactors using a gas coolant system. However, although designed for use in a high temperature gas-cooled reactor wherein operating pressures under normal operating conditions may reach about 700 p.s.i., it is believed that the invention can be advantageously employed in other applications wherein a fluid environment, liquid or gas, which may be radioactive must be contained within a desired region to prevent contamination exterior thereof.

Although the invention has been described with relation to the illustrated embodiment of a gas-cooled reactor environment, it should be understood that various changes and modifications which would be obvious to one skilled in the art may be made to the illustrated embodiments without departing from the scope of the invention which is defined in the claims which follow. For instance, instead of connecting the intermediate chambers to the coolant stream, a separate high pressure source of gas or liquid might be employed. Various of the features of the invention are also set forth in the following claims.

What is claimed is:

1. In a nuclear reactor having a pressure vessel wherein a fluid coolant is employed, containment apparatus for closing a penetration opening into the pressure vessel, which apparatus comprises inner sealing means closing the penetration opening, outer sealing means also closing the penetration opening and disposed outward of said inner sealing means, means defining a chamber intermediate said inner and outer sealing means, means providing fluid communication with said intermediate chamber through which a fluid can be supplied thereto at a pressure higher than the operating pressure of the nuclear reactor, wherein means for increasing the pressure of a fluid is connected to said fluid-communication providing means and wherein means is provided to connect said pressure-increasing means to the fluid coolant stream of the reactor.

2. Apparatus in accordance with claim 1 wherein the nuclear reactor is gas-cooled and said pressure-increasing means is a gas compressor.

3. A method of containing a radioactive coolant which is employed in association with a nuclear reactor pressure vessel having a plurality of penetration openings therethrough, which method comprises providing inner and outer sealing means for each penetration opening into said pressure vessel, and continuously maintaining pressure in a region intermediate each of said inner and outer sealing means which pressure is higher than the operating pressure of the fluid coolant in the nuclear reactor, said higher pressure being continuously maintained in said intermediate regions by diverting fluid from the fluid coolant stream, removing any radioactive particles from seaid diverted fluid, increasing the pressure of the diverted fluid, and supplying said higher pressure fluid to said intermediate regions.

References Cited

UNITED STATES PATENTS

| 1,665,827 | 4/1928 | Tillmann | 220—46 |
| 2,816,679 | 12/1957 | Tinker | 220—46 |
| 3,140,792 | 7/1964 | Harris | 176—87 |
| 3,154,474 | 10/1964 | Guidi | 176—30 X |
| 3,261,611 | 7/1966 | Maidment | 176—87 X |
| 3,276,619 | 10/1966 | Scholz | 220—46 |

FOREIGN PATENTS

| 1,279,425 | 11/1961 | France. |

REUBEN EPSTEIN, *Primary Examiner.*